(12) United States Patent
Taniyama

(10) Patent No.: US 8,116,014 B2
(45) Date of Patent: Feb. 14, 2012

(54) IMAGING LENS, CAMERA MODULE, AND IMAGING APPARATUS

(75) Inventor: Minoru Taniyama, Saitama (JP)

(73) Assignee: Fujinon Corporation, Saitama-shi, Saitama (JP)

( * ) Notice: Subject to any disclaimer, the term of this patent is extended or adjusted under 35 U.S.C. 154(b) by 0 days.

(21) Appl. No.: 12/569,682

(22) Filed: Sep. 29, 2009

(65) Prior Publication Data

US 2010/0103533 A1   Apr. 29, 2010

(30) Foreign Application Priority Data

Oct. 24, 2008   (JP) ................ P2008-274102

(51) Int. Cl.
*G02B 9/34* (2006.01)
*G02B 13/04* (2006.01)
(52) U.S. Cl. ........................ 359/773; 359/753
(58) Field of Classification Search ............. 359/753, 359/773
See application file for complete search history.

(56) References Cited

U.S. PATENT DOCUMENTS

| | | | |
|---|---|---|---|
| 6,476,982 B1 | 11/2002 | Kawakami | |
| 7,535,659 B2 * | 5/2009 | Sano | 359/773 |
| 7,558,005 B2 * | 7/2009 | Yasuhiko | 359/715 |
| 7,633,690 B2 * | 12/2009 | Yasuhiko | 359/773 |
| 7,920,340 B2 * | 4/2011 | Tang | 359/773 |
| 2007/0008625 A1 | 1/2007 | Park et al. | |
| 2007/0188891 A1 | 8/2007 | Shinohara | |

FOREIGN PATENT DOCUMENTS

| | | |
|---|---|---|
| JP | 2002-221659 A | 8/2002 |
| JP | 3424030 B2 | 5/2003 |
| JP | 2004-302057 A | 10/2004 |
| JP | 2004-341013 A | 12/2004 |
| JP | 2005-24581 A | 1/2005 |
| JP | 2005-24889 A | 1/2005 |
| JP | 2007-17984 A | 1/2007 |
| JP | 2007-219079 A | 8/2007 |
| JP | 3146436 U | 10/2008 |

* cited by examiner

*Primary Examiner* — William Choi
(74) *Attorney, Agent, or Firm* — Birch, Stewart, Kolasch & Birch, LLP

(57) ABSTRACT

Disclosed are an imaging lens having a small size and high imaging performance, a camera module that is provided with the imaging lens and can obtain a high-resolution image signal, and an imaging apparatus. An imaging lens includes a first lens having a positive power, a second lens having a negative power, a third lens that has a positive power and includes a convex image-side surface, and a fourth lens that has a negative power and includes an object-side surface which is concave or flat near an optical axis. The first to fourth lenses are arranged in this order from an object side, and the imaging lens satisfies Conditional expression.

31 Claims, 8 Drawing Sheets

EXAMPLE 1

FIG.1  EXAMPLE 1
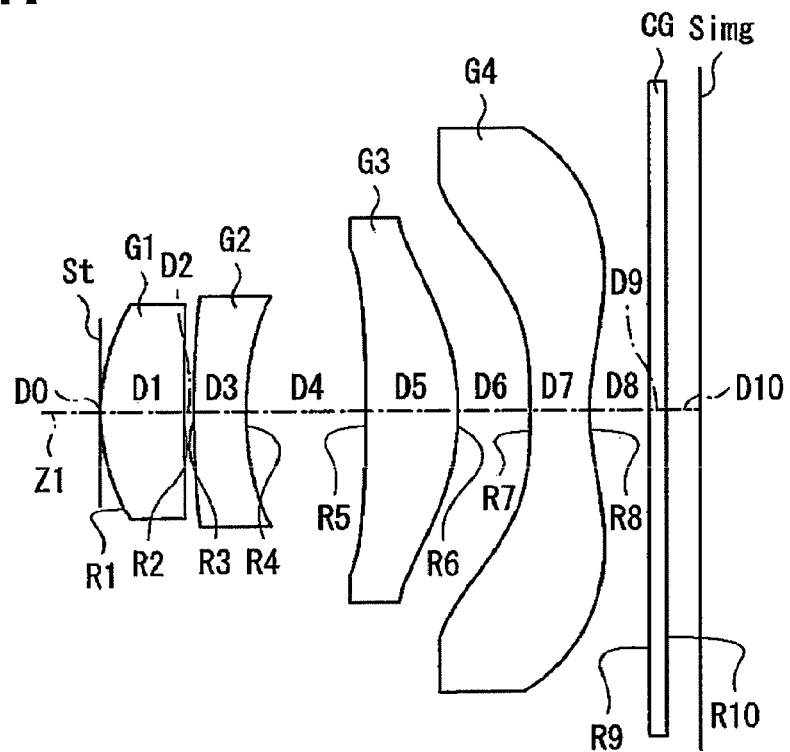
FIG.2  EXAMPLE 2
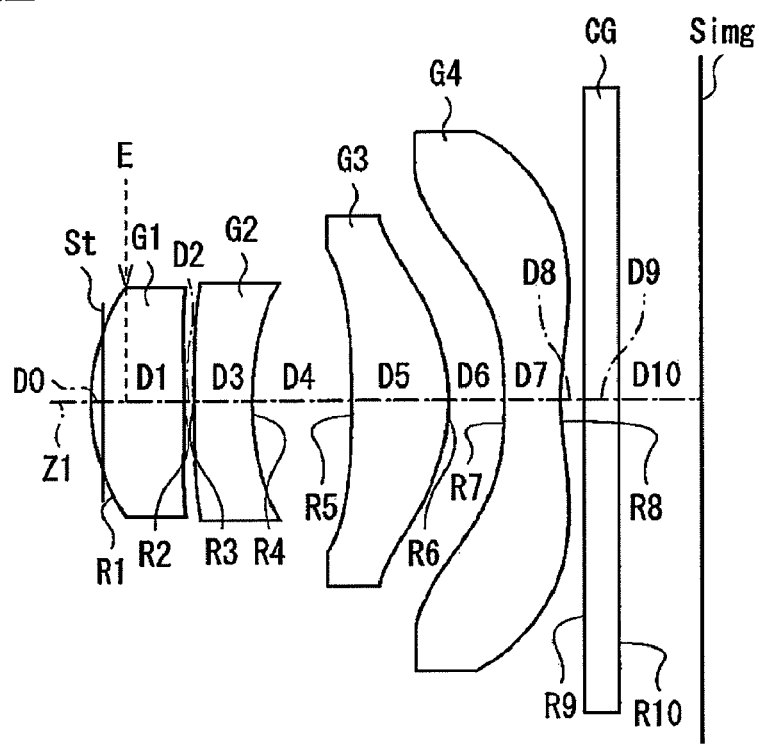

FIG.3  EXAMPLE 3
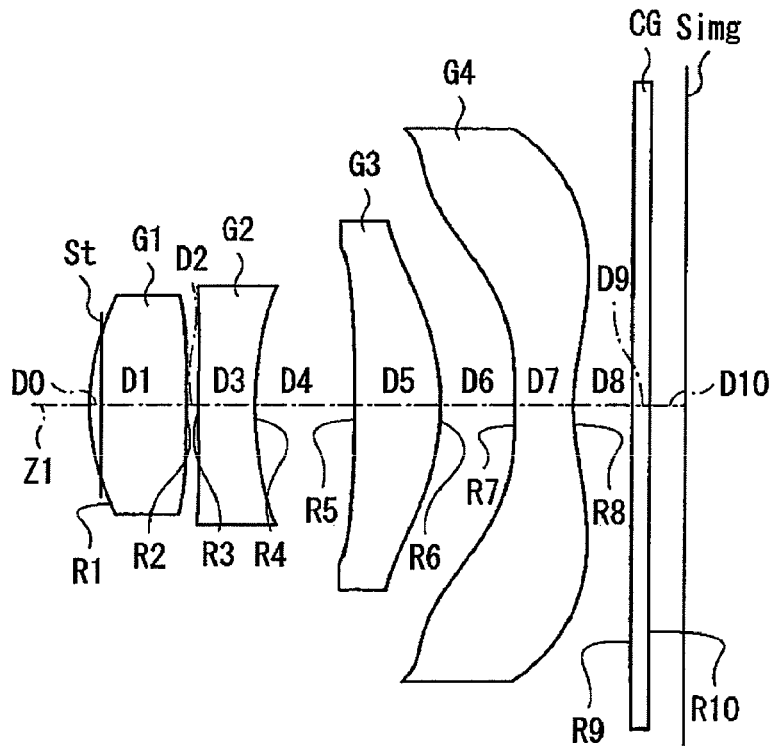
FIG.4  EXAMPLE 4
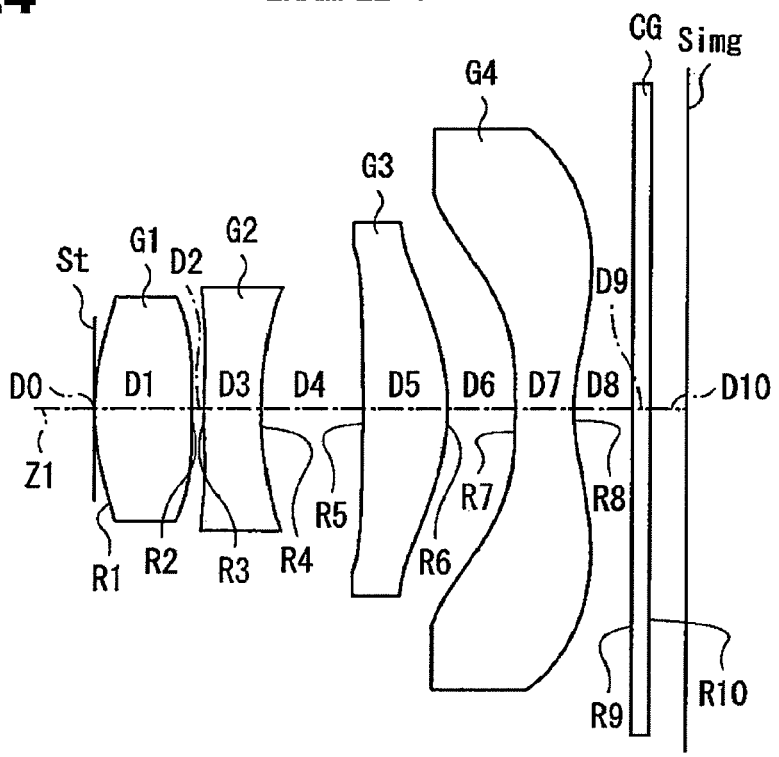

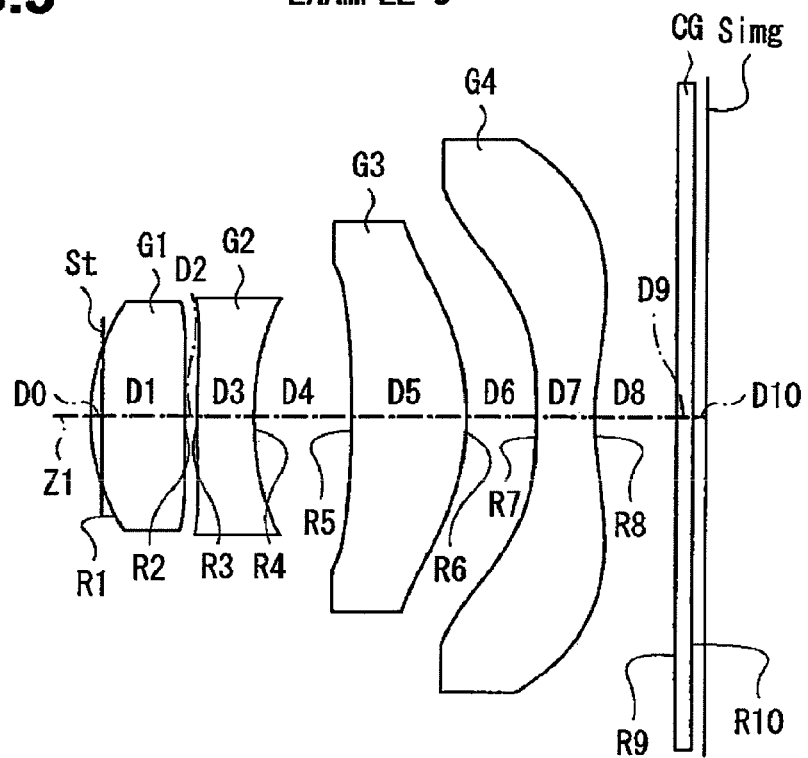
FIG.5  EXAMPLE 5
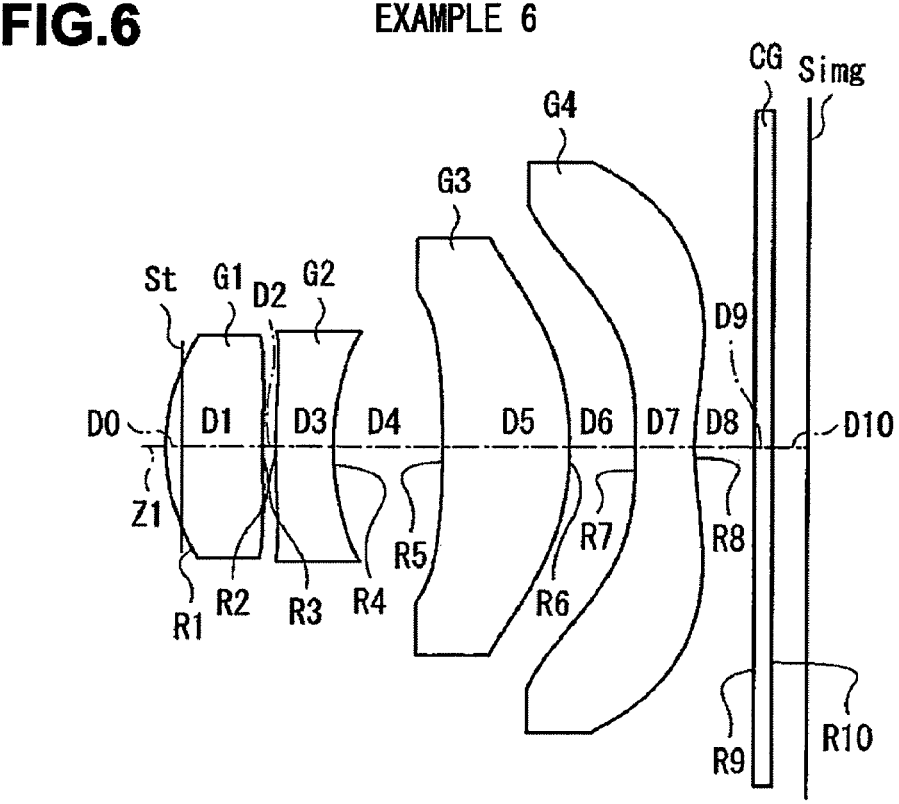
FIG.6  EXAMPLE 6

EXAMPLE 1

Fno.=2.83

EXAMPLE 1

ω=32.3°

EXAMPLE 1

ω=32.3°

EXAMPLE 2

Fno.=2.83

EXAMPLE 2

ω=31.5°

EXAMPLE 2

ω=31.5°

EXAMPLE 3

Fno.=2.81

EXAMPLE 3

$\omega=32.8°$

EXAMPLE 3

$\omega=32.8°$

EXAMPLE 4

Fno.=2.82

EXAMPLE 4

$\omega=33.2°$

EXAMPLE 4

$\omega=33.2°$

EXAMPLE 5

EXAMPLE 5

EXAMPLE 5

EXAMPLE 6

EXAMPLE 6

EXAMPLE 6

US 8,116,014 B2

IMAGING LENS, CAMERA MODULE, AND IMAGING APPARATUS

CROSS-REFERENCE TO RELATED APPLICATIONS

This application is based upon and claims the benefit of priority from the Japanese Patent Application No. 2008-274102 filed on Oct. 24, 2008; the entire contents of which are incorporated herein by reference.

BACKGROUND OF THE INVENTION

1. Field of the Invention

The present invention relates to an imaging lens that focuses an optical image of an object on an imaging device, such as a CCD (charge coupled device) or a CMOS (complementary metal oxide semiconductor), a camera module that converts the optical image formed by the imaging lens into an image signal, and an imaging apparatus, such as a digital still camera, a mobile phone with a camera, or a personal digital assistant (PDA), that is provided with the imaging lens and captures images.

2. Description of the Related Art

In recent years, as personal computers have spread to the home, digital still cameras capable of inputting image information, such as a landscape or a portrait image, to personal computers have spread rapidly. In addition, in many cases, camera modules for inputting images are mounted to mobile phones. An image device, such as a CCD or a CMOS, has been used as the device having an imaging function. In recent years, with a reduction in the size of the imaging device, there is demand for a small imaging apparatus and a small imaging lens provided in the imaging apparatus. At the same time, the number of pixels of the imaging device has been increased, and there is demand for an imaging lens having high resolution and high performance.

JP-A-2002-221659, JP-A-2004-302057, JP-A-2004-341013, JP-A-2005-24581, JP-A-2005-24889, Japanese Patent No. 3424030, JP-A-2007-17984, and JP-A-2007-219079 disclose imaging lenses having a three-lens structure or a four-lens structure. As described in JP-A-2002-221659, JP-A-2004-302057, JP-A-2004-341013, JP-A-2005-24581, JP-A-2005-24889, Japanese Patent No. 3424030, JP-A-2007-17984, and JP-A-2007-219079, particularly, the following imaging lenses each having a four-lens structure have been known: an imaging lens in which four lenses having positive, negative, positive, and positive powers are arranged in this order from the object side; and an imaging lens in which four lenses having positive, negative, positive, and negative powers are arranged in this order from the object side. In the imaging lens having the four-lens structure, in many cases, the lens closest to the image side includes an object-side surface that is convex near the optical axis (in the vicinity of the optical axis). In Examples 5 and 9 disclosed in JP-A-2007-17984, four lenses having positive, negative, positive, and negative powers are arranged, and the lens closest to the image side includes an object-side surface that is concave near the optical axis.

As described above, in recent years, the size of the imaging device has been reduced, and the number of pixels thereof has increased. In the past, particularly, there was demand for an imaging lens used in a portable camera module having a low cost and small size. However, in recent years, the number of pixels of an imaging device of a portable camera module has increased, and there is a demand for an imaging device having high performance. Therefore, it is desirable to develop a variety of lenses considering all factors, such as cost, performance, and size. It is desirable to develop an imaging lens that has a low cost and high performance with performance suitable for mounting to a digital camera. The above-mentioned lenses are insufficient in obtaining both high imaging performance and reduce the size. In addition, although JP-A-2007-17984 discloses various types of imaging lenses having a four-lens structure, optimization conditions for each structural example are not sufficiently examined.

SUMMARY OF THE INVENTION

The invention has been made in order to solve the above-mentioned problems, and an object of the invention is to provide an imaging lens having a small size and high imaging performance, a camera module that is provided with the imaging lens and can obtain a high-resolution image signal, and an imaging apparatus.

According to an aspect of the invention, an imaging lens includes a first lens having a positive power, a second lens having a negative power, a third lens that has a positive power and includes a convex image-side surface, and a fourth lens that has a negative power and includes an object-side surface which is concave or flat near an optical axis. The first to fourth lenses are arranged in this order from an object side, and the imaging lens satisfies Conditional expression 1 given below:

$$0.5 < (|R2| - R1)/(R1 + |R2|) \quad \text{[Conditional expression 1]}$$

(where R1 indicates the curvature radius of an object-side surface of the first lens and R2 indicates the curvature radius of an image-side surface of the first lens).

The imaging lens according to the above-mentioned aspect of the invention has a four-lens structure, and the shape of each lens is appropriately set. Therefore, it is possible to reduce the size of the imaging lens and obtain high imaging performance. Particularly, in the imaging lens according to the above-mentioned aspect of the invention, the lens (fourth lens) closest to the image side includes an object-side surface that is concave or flat near the optical axis, which is effective in reducing the total length of the imaging lens and improving imaging performance. When Conditional expression 1 related to the curvature radius of the first lens is satisfied, it is possible to correct the field curvature. In addition, the object-side surface of the first lens has a relatively large curvature and is deep toward the front side (a convex shape having a small curvature radius). Therefore, it is easy to provide the aperture diaphragm on the side of the object-side surface of the first lens. In particular, when the following preferred structures are appropriately used, it is possible to reduce the total length of the imaging lens and improve imaging performance.

The imaging lens according to the above-mentioned aspect of the invention may selectively satisfy the following conditions:

$$0.6 < |f4/f| < 1.0, \quad \text{[Conditional expression 2]}$$

$$0.5 < |f2/f| < 4, \quad \text{[Conditional expression 3]}$$

$$0.5 < f3/f < 2, \quad \text{[Conditional expression 4]}$$

$$20 < v1 - v2, \quad \text{[Conditional expression 5]}$$

$$0.1 < D4/f < 0.3, \text{ and} \quad \text{[Conditional expression 6]}$$

$$|R5| > |R6| \quad \text{[Conditional expression 7]}$$

(where f indicates the focal length of the entire lens system, f2 indicates the focal length of the second lens, f3 indicates the focal length of the third lens, f4 indicates the focal length of the fourth lens, v1 indicates the Abbe number of the first lens with respect to the d-line, v2 indicates the Abbe number of the second lens with respect to the d-line, D4 indicates the gap between the second lens and the third lens on the optical axis, R5 indicates the curvature radius of the object-side surface of the third lens, and R6 indicates the curvature radius of the image-side surface of the third lens).

When the above-mentioned conditional expressions are selectively satisfied, the structure of each lens is optimized, and it is possible to reduce the total length of the imaging lens and improve imaging performance.

The first lens may have a meniscus shape near the optical axis in which a convex surface faces the object side. The second lens may have a meniscus shape in which a convex surface faces the object side. Each of the first lens, the second lens, the third lens, and the fourth lens may have at least one aspheric surface.

Each of the first lens, the second lens, the third lens, and the fourth lens may be made of a resin material. In this way, it is possible to reduce manufacturing costs. For example, the first lens may be made of a glass material in order to obtain high performance.

The imaging lens according to the above-mentioned aspect may further include an aperture diaphragm that is provided between the top of the object-side surface of the first lens and the top of an image-side surface of the first lens on the optical axis. The aperture diaphragm may be provided closer to the object side, for example, between the top of the object-side surface of the first lens and the edge of the object-side surface of the first lens in an effective diameter range on the optical axis.

According to another aspect of the invention, a camera module includes: the imaging lens according to the above-mentioned aspect; and an imaging device that outputs an image signal corresponding to an optical image formed by the imaging lens. According to the camera module of the above-mentioned aspect, it is possible to obtain a high-resolution image signal on the basis of a high-resolution optical image obtained by the imaging lens according to the above-mentioned aspect. Since the total length of the imaging lens can be reduced, it is possible to reduce the overall size of the camera module combined with the imaging lens.

According to still another aspect of the invention, an imaging apparatus includes the camera module according to the above-mentioned aspect. According to the imaging apparatus of the above-mentioned aspect, a high-resolution image signal is obtained on the basis of a high-resolution optical image obtained by the camera module according to the above-mentioned aspect, and a high-resolution captured image is obtained on the basis of the image signal.

The imaging lens according to the above-mentioned aspect of the invention has a four-lens structure, and the shape of each lens is appropriately set. Since the imaging lens satisfies a predetermined conditional expression, it is possible to reduce the size of an imaging lens and obtain high imaging performance.

The camera module according to the above-mentioned aspect of the invention outputs an image signal corresponding to the optical image formed by the imaging lens having a small size and high imaging performance according to the invention. Therefore, it is possible to reduce the overall size of a module and obtain a high-resolution image signal.

The imaging apparatus according to the above-mentioned aspect of the invention includes the camera module according to the above-mentioned aspect of the invention. It is possible to reduce the size of the imaging apparatus by a value corresponding to the reduction in the size of the camera unit. In addition, since a high-resolution image signal is obtained, it is possible to obtain high-resolution captured images on the basis of the image signal.

BRIEF DESCRIPTION OF THE DRAWINGS

FIG. 1 is a diagram illustrating a first structural example of an imaging lens according to an embodiment of the invention, and is a lens cross-sectional view corresponding to Example 1;

FIG. 2 is a diagram illustrating a second structural example of the imaging lens according to the embodiment of the invention, and is a lens cross-sectional view corresponding to Example 2;

FIG. 3 is a diagram illustrating a third structural example of the imaging lens according to the embodiment of the invention, and is a lens cross-sectional view corresponding to Example 3;

FIG. 4 is a diagram illustrating a fourth structural example of the imaging lens according to the embodiment of the invention, and is a lens cross-sectional view corresponding to Example 4;

FIG. 5 is a diagram illustrating a fifth structural example of the imaging lens according to the embodiment of the invention, and is a lens cross-sectional view corresponding to Example 5;

FIG. 6 is a diagram illustrating a sixth structural example of the imaging lens according to the embodiment of the invention, and is a lens cross-sectional view corresponding to Example 6;

DESCRIPTION OF THE PREFERRED EMBODIMENTS

Figure 7A:
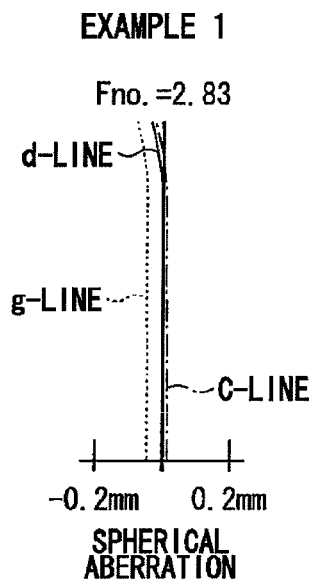
FIGS. 7A to 7C are diagrams illustrating all aberrations of the imaging lens according to Example 1 of the invention.

Hereinafter, exemplary embodiments of the invention will be described in detail with reference to the accompanying drawings.

FIG. 1 is a diagram illustrating a first structural example of an imaging lens according to an embodiment of the invention. The structural example corresponds to the structure of a lens according to a first numerical example (Table 1A and Table 1B), which will be described below. FIGS. 2 to 6 show the cross-sectional structures of second to sixth structural examples corresponding to the structures of lenses according to second to sixth numerical examples, which will be described below. In FIGS. 1 to 6, Ri indicates the curvature radius of an i-th surface. In this case, the surface of a lens component closest to an object side is given number 1 (an aperture diaphragm St is a zeroth component), and the surface number is sequentially increased toward an image side (imaging side). In addition, Di indicates the surface spacing between the i-th surface and an (i+1)-th surface on an optical axis Z1. The examples have the same basic structure. Therefore, the structural example of the imaging lens shown in FIG. 1 will be basically described, and the structural examples shown in FIGS. 2 to 6 will be described if necessary.

The imaging lens according to this embodiment can be used in various imaging apparatuses using an imaging device, such as a CCD or a CMOS, particularly, for relatively small portable terminal apparatuses, such as a digital still camera, a mobile phone with a camera, and a PDA. The imaging lens includes an aperture diaphragm St, a first lens G1, a second lens G2, a third lens G3, and a fourth lens G4 arranged in this order from an object side along the optical axis Z1. An imaging device (not shown), such as a CCD, is provided on an image forming surface (imaging surface) Simg of the imaging lens. Optical members CG, such as a cover glass for protecting the imaging surface, an infrared cut filter, and a low pass filter, may be provided between the fourth lens G4 and the image forming surface (imaging surface). In this case, for example, a member obtained by coating a film having a filter effect, such as an infrared cut filter or an ND filter, onto a plate-shaped cover glass may be used as the optical member CG. In addition, in the imaging lens, a film having a filter effect, such as an infrared cut filter or an ND filter, or an antireflection film may be coated onto the surfaces of all of the lenses or at least one lens surface.

The aperture diaphragm St is an optical aperture diaphragm. It is preferable that the aperture diaphragm St be arranged closest to the object side. The term 'arranged closest to the object side' includes both the case in which the aperture diaphragm St is arranged at the top of an object-side surface of the first lens G1 on the optical axis Z1, as in the structural examples shown in FIGS. 1 and 4, and the case in which the aperture diaphragm St is arranged between the top of the object-side surface of the first lens G1 and the top of an image-side surface thereof, as in the other structural examples. It is preferable that the aperture diaphragm St be arranged between the top of the object-side surface of the first lens G1 and the edge E (see FIG. 2) of the object-side surface of the first lens G1 in an effective diameter range on the optical axis.

The first lens G1 has a positive power. It is preferable that the first lens G1 have a meniscus shape near the optical axis in which a convex surface faces the object side. In this embodiment, in the structural example shown in FIG. 2, the first lens G1 has a biconvex shape near the optical axis, and in the other structural examples, the first lens G1 has a meniscus shape near the optical axis.

The second lens G2 has a negative power. It is preferable that the second lens G2 have a meniscus shape in which a convex surface faces the object side. In this embodiment, in the structural example shown in FIG. 2, the second lens G2 has a biconcave shape near the optical axis, and in the other structural examples, the second lens G2 has a meniscus shape near the optical axis.

The third lens G3 includes an image-side surface that is convex near the optical axis and has a positive power. An object-side surface of the third lens G3 is concave near the optical axis.

The fourth lens G4 includes an object-side surface that is concave or flat near the optical axis, and has a negative power. In this embodiment, in the structural example shown in FIG. 3, the object-side surface of the fourth lens G4 is flat near the optical axis, and in the other structural examples, the object-side surface of the fourth lens G4 is concave near the optical axis. In addition, it is preferable that the image-side surface of the fourth lens G4 be concave near the optical axis. The fourth lens G4 serves as a negative lens at the center (near the optical axis). Therefore, it is preferable that the fourth lens G4 have a biconcave shape at the center in order to reduce the curvature of the image-side surface.

It is preferable that the first lens G1, the second lens G2, the third lens G3, and the fourth lens G4 each have at least one aspheric surface. Particularly, it is preferable that the image-side surface of the fourth lens G4 be an aspheric surface that is concave to the image side near the optical axis and is convex to the image side in the periphery.

Particularly, when the image-side surface of the fourth lens G4 is an aspheric surface, the second lens G2, the third lens G3, and the fourth lens G4 are likely to have complicated shapes, as compared to the first lens G1, and the sizes thereof are likely to increase. Therefore, the second lens G2, the third lens G3, and the fourth lens G4 are preferably made of a resin material in terms of formability and manufacturing costs. It is preferable that the first lens G1 also be made of a resin material in terms of manufacturing costs. However, the first lens G1 may be made of a glass material in order to improve performance.

It is preferable that the imaging lens satisfy Conditional expression 1 given below:

$$0.5 < (|R2|-R1)/(R1+|R2|) \qquad \text{[Conditional expression 1]}$$

(where R1 indicates the curvature radius of the object-side surface of the first lens G1 and R2 indicates the curvature radius of the image-side surface of the first lens G1).

In addition, it is preferable that the imaging lens selectively satisfy Conditional expressions 2 to 7 given below:

$$0.6 < |f4/f| < 1.0, \qquad \text{[Conditional expression 2]}$$

$$0.5 < |f2/f| < 4, \qquad \text{[Conditional expression 3]}$$

$$0.5 < f3/f < 2, \qquad \text{[Conditional expression 4]}$$

$$20 < v1 - v2, \qquad \text{[Conditional expression 5]}$$

$$0.1 < D4/f < 0.3, \text{ and} \qquad \text{[Conditional expression 6]}$$

$$|R5| > |R6| \qquad \text{[Conditional expression 7]}$$

(where f indicates the focal length of the entire lens system, f2 indicates the focal length of the second lens G2, f3 indicates the focal length of the third lens G3, f4 indicates the focal length of the fourth lens G4, v1 indicates the Abbe number of the first lens G1 with respect to the d-line, v2 indicates the Abbe number of the second lens G2 with respect to the d-line, D4 indicates the gap between the second lens G2 and the third lens G3 on the optical axis, R5 indicates the curvature radius of the object-side surface of the third lens G3, and R6 indicates the curvature radius of the image-side surface of the third lens G3).

Figure 13:
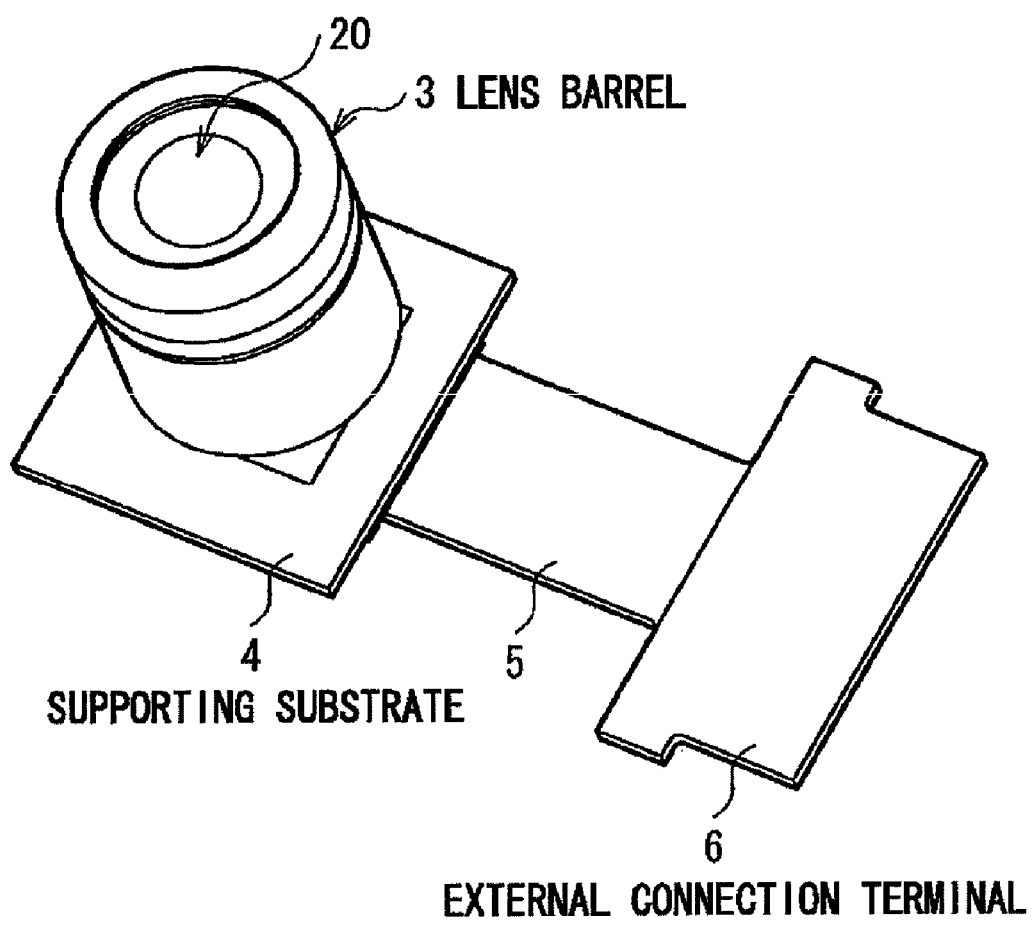
FIG. 13 is a perspective view illustrating an example of the structure of a camera module according to another embodiment of the invention.
Figure 14A:
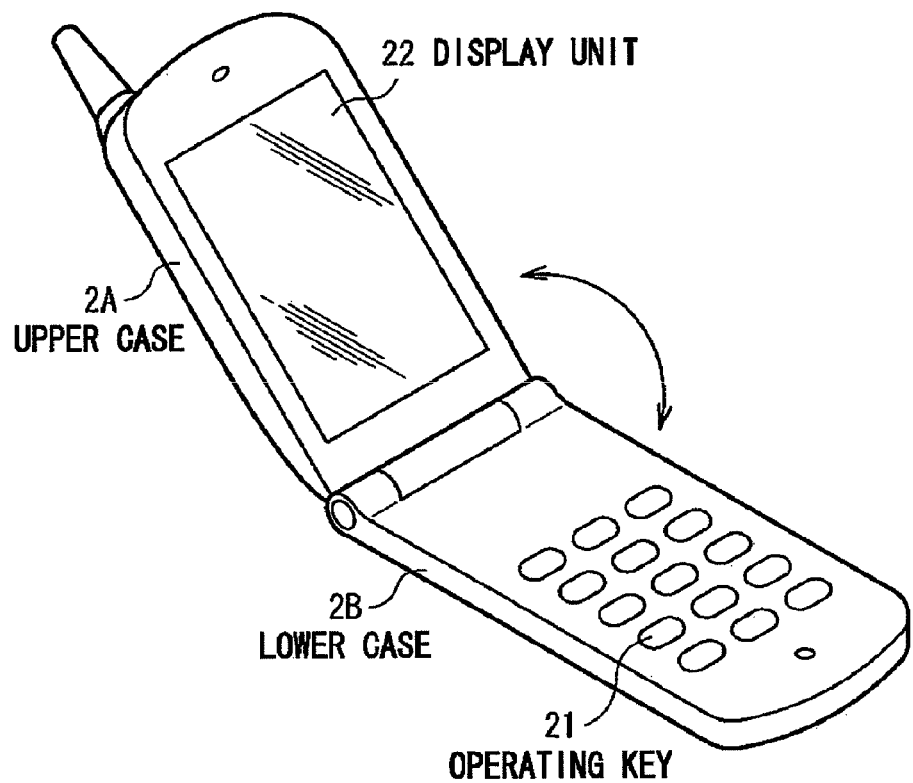
FIGS. 14A and 14B are perspective views illustrating examples of the structure of an imaging apparatus according to another embodiment of the invention.
Figure 14B:
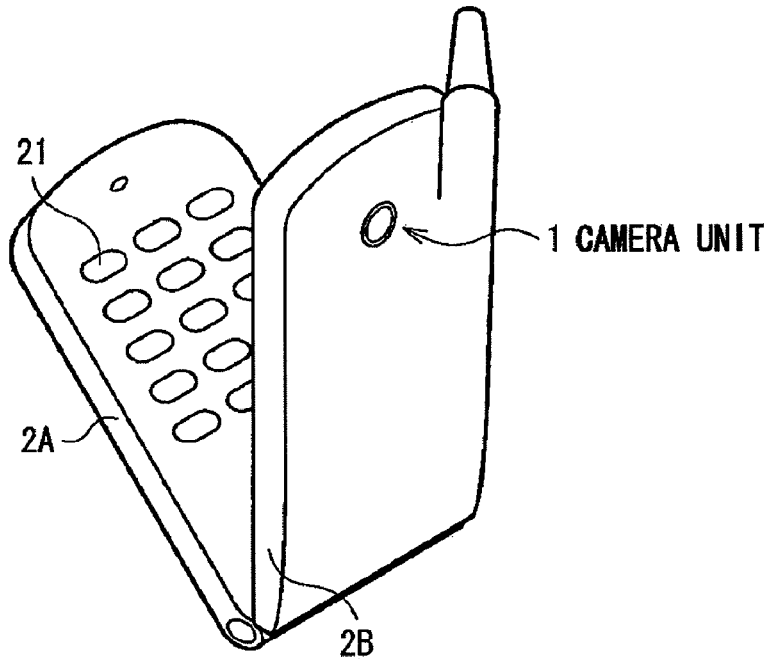

FIG. 13 is a diagram illustrating an example of the structure of a camera module having the imaging lens according to this embodiment incorporated thereinto. FIGS. 14A and 14B are diagrams illustrating a mobile phone with a camera, which is an example of an imaging apparatus provided with the camera module shown in FIG. 13.

The mobile phone with a camera shown in FIGS. 14A and 14B includes an upper case 2A and a lower case 2B, and the two cases are configured so as to be rotatable in the direction of the arrow in FIG. 14A. The lower case 2B is provided with, for example, operating keys 21. The upper case 2A is provided with, for example, a camera unit 1 (FIG. 14B) and a display unit 22 (FIG. 14A). The display unit 22 is composed of a display panel, such as an LCD (liquid crystal panel) or an EL (electro-luminescence) panel. The display unit 22 is provided on a surface of the mobile phone that is disposed inside when it is folded. The display unit 22 can display the image captured by the camera unit 1 as well as various menus related to a call function. The camera unit 1 is provided on the rear surface of the upper case 2A. However, the position of the camera unit 1 is not limited thereto.

The camera unit 1 includes the camera module according to this embodiment. As shown in FIG. 13, the camera module includes a lens barrel 3 having an imaging lens 20 provided therein, a supporting substrate 4 that supports the lens barrel 3, and an imaging device (not shown) that is provided on the supporting substrate 4 at a position corresponding to the imaging surface of the imaging lens 20. The camera module further includes a flexible substrate 5 that is electrically connected to the imaging device on the supporting substrate 4 and an external connection terminal 6 that is electrically connected to the flexible substrate 5 and can be electrically connected to a signal processing circuit of a terminal apparatus body of a mobile phone with a camera. These components are integrally formed.

In the camera module shown in FIG. 13, an optical image formed by the imaging lens 20 is converted into electric image signals by the imaging device, and the image signals are output to the signal processing circuit of the imaging apparatus body through the flexible substrate 5 and the external connection terminal 6. In the camera module, since the imaging lens according to this embodiment is used as the imaging lens 20, it is possible to obtain a high-resolution image signal whose aberrations have been sufficiently corrected. The imaging apparatus body can generate a high-resolution image on the basis of the image signal.

The imaging apparatus according to this embodiment is not limited to the mobile phone with a camera, but it may be, for example, a digital still camera or a PDA.

Next, the operation and effect of the imaging lens having the above-mentioned structure, particularly, the operation and effect related to the conditional expressions will be described in detail.

The imaging lens according to this embodiment has a four-lens structure, and the four lenses have positive, negative, positive, and negative powers in this order from the object side. The surface shape of each lens is appropriately set and each lens is formed so as to satisfy predetermined conditional expressions. In this way, it is possible to reduce the total length of the imaging lens and obtain high imaging performance. Particularly, in the imaging lens, the object-side surface of the lens (fourth lens G4) closest to the image side is concave or flat near the optical axis, and the imaging lens has a structure that is effective in reducing the overall length and improving imaging performance. In addition, since the fourth lens G4 has a negative power, it is effective in ensuring the back focal length. If the positive power of the fourth lens G4 is excessively high, it is difficult to ensure a sufficient back focal length.

In the imaging lens, the first lens G1, the second lens G2, the third lens G3, and the fourth lens G4 each have at least one aspheric surface, which is effective in maintaining aberration performance. In particular, in the fourth lens G4, beams are separated at each angle of view, as compared to the first lens G1, the second lens G2, and the third lens G3. Therefore, the image-side surface of the fourth lens G4, which is the last lens surface closest to the imaging device, is formed such that it is concave to the image side near the optical axis and is convex to the image side in the periphery. In this way, aberrations are appropriately corrected at each angle of view, and the incident angle of a beam on the imaging device is controlled to be equal to or less than a predetermined value. Therefore, it is possible to reduce variation in the quantity of light in the entire imaging surface and effectively correct, for example, field curvature or distortion.

In general, it is preferable that the imaging lens system be telecentric, that is, the incident angle of a main beam on the imaging device be approximately parallel to the optical axis (the incident angle of a beam on the imaging surface is approximately zero with respect to the normal line of the imaging surface). It is preferable that the aperture diaphragm St be arranged as close to the object side as possible in order to ensure telecentricity. When the aperture diaphragm St is arranged at a position spaced from the object-side surface of the first lens G1 to the object side, the length of the optical path is increased by a value corresponding to the space (the distance between the aperture diaphragm St and the object-side surface), which makes it difficult to reduce the overall size of the structure. Therefore, the aperture diaphragm St is disposed at the same position as the top of the object-side lens surface of the first lens G1 on the optical axis Z1, or it is arranged between the top of object-side surface of the first lens G1 and the top of the image-side surface thereof. In this way, it is possible to reduce the total length of the imaging lens and ensure telecentricity. When telecentricity is considered first of all, the aperture diaphragm St may be arranged between the top of the object-side surface of the first lens G1 and the edge E (see FIG. 2) of the object-side surface of the first lens G1 on the optical axis. Next, the detailed meaning of each conditional expression will be described.

Conditional expression 1 relates to the curvature radius of the first lens G1. When Conditional expression 1 is satisfied, the field curvature is effectively corrected. When the field curvature is not effectively corrected, a high-quality image is not formed in a portion of the imaging area even when the imaging device is arranged at a focus position. When Conditional expression 1 is satisfied, it is possible to obtain a high-quality image in the periphery of the focus position over the entire imaging area, and it is easy to assemble and adjust the imaging lens and the imaging device. In addition, when Conditional expression 1 is satisfied, the object-side surface of the first lens G1 has a relative large curvature and is deep toward the front side (a convex shape having a small curvature radius), and the space for providing the aperture diaphragm St is increased. In this way, the flexibility of the position of the aperture diaphragm is increased, and it is easy to provide the aperture diaphragm St on the side of the object-side surface of the first lens G1. It is preferable that the numerical range of Conditional expression 1 be the following range, in order to further improve performance:

$$0.6<(|R2|-R1)/(R1+|R2|)<1.0. \quad \text{[Conditional expression 1A]}$$

If the absolute value is greater than the upper limit of Conditional expression 1A, the curvature of each surface of the first lens G1 is excessively large, and it is difficult to manufacture the lens.

Conditional expression 2 relates to the focal length f4 of the fourth lens G4. If the absolute value is greater than the upper limit of the numerical range and the power of the fourth lens G4 is reduced, it is difficult to reduce the total length of the imaging lens. If the absolute value is less than the lower limit of the numerical range, the power of the fourth lens G4 is increased, and the power of the third lens G3 also needs to be increased in order to cancel the increase in power. As a result, off-axis performance deteriorates.

Conditional expression 3 relates to the focal length f2 of the second lens G2. If the absolute value is less than the lower limit of the numerical range, the power of the second lens G2 is excessively high, which results in an increase in aberrations. If the absolute value is greater than the upper limit of the numerical range, the power is excessively low, and it is difficult to correct, for example, field curvature and astigmatism. It is preferable that the numerical range of Conditional expression 3 be the following range in order to further improve performance:

$$0.95<|f2/f|<3.5. \quad \text{[Conditional expression 3A]}$$

Conditional expression 4 relates to the focal length f3 of the third lens G3. If the absolute value is less than the lower limit of the numerical range and the positive power of the third lens G3 is excessively high, performance deteriorates, and it is difficult to ensure the back focal length. If the absolute value is greater than the upper limit of the numerical range, the positive power is excessively low, and it is difficult to sufficiently correct aberrations. It is preferable that the numerical range of Conditional expression 4 be the following range in order to further improve performance:

$$0.9<f3/f<1.7. \quad \text{[Conditional expression 4A]}$$

Conditional expression 5 regulates the variance of the first lens G1 and the second lens G2. When the numerical range is satisfied, it is possible to reduce longitudinal chromatic aberrations. It is preferable that the numerical range of Conditional expression 5 be the following range in order to further improve performance:

$$25<v1-v2<33. \quad \text{[Conditional expression 5A]}$$

If the difference is greater than the upper limit of Conditional expression 5A, the kind of a lens material is limited, and material costs increase.

Conditional expression 6 relates to the gap between the second lens G2 and the third lens G3 and the focal length f of the entire lens system. If the ratio is greater than the upper limit of the numerical range, it is difficult to reduce the total length. If the ratio is less than the lower limit of the numerical range, it is difficult to ensure a sufficient gap between the second lens G2 and the third lens G3. It is preferable that the numerical range of Conditional expression 6 be the following range in order to further improve performance:

$$0.15<D4/f<0.25. \quad \text{[Conditional expression 6A]}$$

Conditional expression 7 relates to the curvature radius of the third lens G3. It is preferable that the absolute value of the curvature radius R5 of the object-side surface be greater than the curvature radius R6 of the image-side surface in order to correct aberrations occurring in the first lens G1 and the second lens G2.

As described above, according to the imaging lens of this embodiment, it is possible to reduce the size and improve imaging performance. In addition, according to the camera module of this embodiment, it is possible to output an image signal corresponding to the optical image formed by the imaging lens having a small size and high imaging performance. Therefore, it is possible to reduce the overall size of the module and obtain high-resolution image signal. Further, according to the imaging apparatus of this embodiment, since the imaging apparatus includes the camera module, it is possible to reduce the size of a camera and obtain a high-resolution image signal. It is possible to obtain a high-resolution captured image on the basis of the image signal.

EXAMPLES

Next, detailed numerical examples of the imaging lens according to this embodiment will be described. A plurality of numerical examples will be described below.

Table 1A and Table 1B show detailed lens data corresponding to the structure of the imaging lens shown in FIG. 1.

TABLE 1A

| EXAMPLE 1, BASIC LENS DATA | | | | |
|---|---|---|---|---|
| Si (SURFACE NUMBER) | Ri (CURVATURE RADIUS) | Di (SURFACE SPACING) | Ndj (REFRACTIVE INDEX) | vdj (ABBE NUMBER) |
| 0(APERTURE DIAPHRAGM) | — | 0.000 | | |
| 1 | 1.753 | 0.700 | 1.531 | 55.4 |
| 2 | 99.176 | 0.085 | | |
| 3 | 9.927 | 0.440 | 1.614 | 25.5 |
| 4 | 2.943 | 0.997 | | |
| 5 | −20.466 | 0.767 | 1.531 | 55.4 |
| 6 | −2.421 | 0.600 | | |
| 7 | −4664.872 | 0.491 | 1.510 | 56.5 |

TABLE 1A-continued

EXAMPLE 1, BASIC LENS DATA

| Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|
| 8 | 1.642 | 0.500 | | |
| 9 | ∞ | 0.145 | 1.516 | 64.1 |
| 10 | ∞ | 0.287 | | |

(f = 4.532, Fno. = 2.83)

TABLE 1B

EXAMPLE 1, ASPHERIC DATA

| ASPHERIC SURFACE COEFFICIENT | SURFACE NUMBER | | | |
|---|---|---|---|---|
| | FIRST SURFACE | SECOND SURFACE | THIRD SURFACE | FOURTH SURFACE |
| K | 1.615E−01 | −9.700E+01 | −2.162E+01 | −1.036E+00 |
| A3 | −2.915E−03 | 2.040E−02 | −5.563E−03 | 2.608E−02 |
| A4 | 3.578E−02 | −3.325E−02 | 5.508E−02 | −5.864E−02 |
| A5 | −2.369E−02 | 6.091E−02 | −7.271E−02 | 2.063E−01 |
| A6 | −2.004E−02 | −3.524E−02 | 7.239E−02 | −1.591E−01 |
| A7 | 1.084E−01 | −9.887E−03 | −1.152E−01 | −5.602E−02 |
| A8 | −1.050E−01 | −9.646E−02 | −3.895E−02 | 6.580E−02 |
| A9 | 7.265E−03 | 1.025E−01 | 1.935E−01 | 9.220E−02 |
| A10 | 2.939E−02 | 1.835E−02 | −7.363E−02 | −5.941E−02 |
| | FIFTH SURFACE | SIXTH SURFACE | SEVENTH SURFACE | EIGHTH SURFACE |
| K | 9.851E+00 | −4.725E+01 | −8.900E+01 | −7.710E+00 |
| A3 | −3.426E−03 | −2.051E−01 | −1.823E−01 | −1.022E−01 |
| A4 | −4.252E−02 | 1.747E−02 | −2.695E−02 | 3.326E−02 |
| A5 | 3.177E−02 | 8.064E−02 | −8.447E−03 | −2.904E−02 |
| A6 | 5.417E−02 | −2.655E−02 | 1.818E−02 | 2.459E−02 |
| A7 | −8.120E−02 | −1.453E−02 | 1.097E−02 | −1.466E−02 |
| A8 | −8.275E−03 | 5.168E−03 | −2.722E−03 | 2.140E−03 |
| A9 | 5.353E−02 | 7.690E−03 | −1.256E−03 | 1.417E−03 |
| A10 | −2.186E−02 | −3.104E−03 | 1.482E−04 | −4.323E−04 |

Particularly, Table 1A shows the basic lens data of the imaging lens, and Table 1B shows data related to the aspheric surfaces. In the lens data shown in Table 1A, an i-th surface number is written in the field of a surface number Si. In this case, the surface of a lens component closest to the object side in the imaging lens according to Example 1 is given number 1 (the aperture diaphragm St is a zeroth component), and the surface number is sequentially increased toward the image side. The curvature radius (mm) of the i-th surface from the object side is written in the field of a curvature radius Ri so as to correspond to Ri shown in FIG. 1. The spacing (mm) between the i-th surface Si and an (i+1)-th surface Si+1 from the object side on the optical axis is written in the field of a surface spacing Di. The refractive index of a j-th optical component from the object side with respect to the d-line (wavelength: 587.6 nm) is written in the field of Ndj. The Abbe number of the j-th optical component from the object side with respect to the d-line is written in the field of vdj. The other data, such as the focal length f (mm) of the entire lens system and an F number (Fno.), is shown outside the fields of Table 1A.

In the imaging lens according to Example 1, the first to fourth lenses G1 to G4 each have aspheric surfaces at both sides. The basic lens data shown in Table 1A includes the curvature radii of these aspheric surfaces near the optical axis.

Table 1B shows aspheric data of the imaging lens according to Example 1. In the numerical values represented as the aspheric data in Table 1B, 'E' indicates the exponent of 10, and the number represented by an exponential function having 10 as a base is multiplied by the number before 'E'. For example, '1.0E-02' indicates '1.0×10$^{-2}$'.

The aspheric data includes coefficients Ai and K of Aspheric expression A given below:

$$Z = C \cdot h^2 / \{1 + (1 - K \cdot C^2 \cdot h^2)^{1/2}\} + \Sigma Ai \cdot h^i \qquad \text{[Aspheric expression A]}$$

(where Z indicates the depth (mm) of an aspheric surface (specifically, Z indicates the length (mm) of a perpendicular line that drops from a point on an aspheric surface at a height h from the optical axis to a tangent plane to the top of the aspheric surface (a plane vertical to the optical axis), h indicates the distance (height) (mm) from the optical axis to a lens surface, K indicates eccentricity, C indicates a paraxial curvature=1/R (R is a paraxial curvature radius), and Ai indicates an i-order aspheric coefficient (i is an integer equal to or greater than 3).

In the imaging lens according to Example 1, each aspheric surface is represented by effectively using the third-order to tenth-order coefficients A3 to A10 as the aspheric coefficient Ai.

Table 2A and Table 2B show detailed lens data corresponding to the structure of an imaging lens according to Example 2 shown in FIG. 2, similar to the imaging lens according to Example 1.

TABLE 2A

EXAMPLE 2, BASIC LENS DATA

| Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|
| 0(APERTURE DIAPHRAGM) | — | −0.100 | | |
| 1 | 1.705 | 0.791 | 1.510 | 56.5 |
| 2 | −9.858 | 0.090 | | |
| 3 | −2000.000 | 0.485 | 1.614 | 25.5 |
| 4 | 2.986 | 0.849 | | |
| 5 | −7.516 | 0.813 | 1.531 | 55.4 |

TABLE 2A-continued

EXAMPLE 2, BASIC LENS DATA

| Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|
| 6 | −1.848 | 0.465 | | |
| 7 | −14.901 | 0.475 | 1.510 | 56.5 |
| 8 | 1.886 | 0.000 | | |
| 9 | ∞ | 0.300 | 1.516 | 64.1 |
| 10 | ∞ | 0.705 | | |

(f = 4.657, Fno. = 2.83)

TABLE 2B

EXAMPLE 2, ASPHERIC DATA

| ASPHERIC SURFACE COEFFICIENT | FIRST SURFACE | SECOND SURFACE | THIRD SURFACE | FOURTH SURFACE |
|---|---|---|---|---|
| K | −4.116E−01 | 0.000E+00 | −4.537E+01 | 4.619E+00 |
| A3 | 9.900E−03 | 2.339E−02 | 1.551E−02 | 4.012E−02 |
| A4 | 1.090E−02 | 2.099E−02 | 7.732E−02 | −8.827E−02 |
| A5 | 1.462E−02 | 4.303E−02 | −6.710E−02 | 2.064E−01 |
| A6 | −1.412E−02 | −3.106E−02 | 7.834E−02 | −1.448E−01 |
| A7 | 8.967E−02 | 3.492E−02 | −8.522E−02 | −6.293E−02 |
| A8 | −9.587E−02 | −5.519E−02 | −2.303E−02 | 5.555E−02 |
| A9 | 5.602E−03 | 5.970E−02 | 1.698E−01 | 9.371E−02 |
| A10 | 2.426E−02 | −3.311E−02 | −1.117E−01 | −6.009E−02 |

| | FIFTH SURFACE | SIXTH SURFACE | SEVENTH SURFACE | EIGHTH SURFACE |
|---|---|---|---|---|
| K | 9.860E−01 | −1.091E+01 | 3.069E+00 | −9.990E+00 |
| A3 | −1.677E−02 | −1.314E−01 | −2.355E−01 | −1.350E−01 |
| A4 | −1.415E−02 | −5.879E−02 | 2.365E−02 | 5.420E−02 |
| A5 | −2.330E−02 | 6.573E−02 | −6.570E−03 | −4.593E−02 |
| A6 | 5.005E−02 | −6.060E−04 | 1.142E−02 | 2.959E−02 |
| A7 | −1.408E−02 | −5.580E−03 | 1.026E−02 | −1.126E−02 |
| A8 | −2.553E−02 | −1.344E−03 | −1.605E−03 | 9.974E−04 |
| A9 | 9.985E−03 | 2.911E−03 | −8.718E−04 | 7.736E−04 |
| A10 | −3.206E−04 | 6.023E−05 | −8.849E−05 | −2.348E−04 |

Similarly, Table 3A to Table 6B show detailed lens data corresponding to the structures of imaging lenses according to Examples 3 to 6 shown in FIGS. 3 to 6.

TABLE 3A

EXAMPLE 3, BASIC LENS DATA

| Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|
| 0(APERTURE DIAPHRAGM) | — | −0.10 | | |
| 1 | 1.897 | 0.807 | 1.531 | 55.4 |
| 2 | 42.323 | 0.102 | | |
| 3 | 7.582 | 0.479 | 1.614 | 25.5 |
| 4 | 3.172 | 0.842 | | |
| 5 | −25.003 | 0.726 | 1.531 | 55.4 |
| 6 | −2.418 | 0.626 | | |
| 7 | ∞ | 0.490 | 1.510 | 56.5 |
| 8 | 1.616 | 0.500 | | |
| 9 | ∞ | 0.145 | 1.516 | 64.1 |
| 10 | ∞ | 0.291 | | |

(f = 4.446, Fno. = 2.81)

TABLE 3B

EXAMPLE 3, ASPHERIC DATA

| ASPHERIC SURFACE COEFFICIENT | FIRST SURFACE | SECOND SURFACE | THIRD SURFACE | FOURTH SURFACE |
|---|---|---|---|---|
| K | 5.018E−02 | −9.500E+01 | −4.997E+01 | −1.061E+01 |
| A3 | −5.644E−03 | −8.870E−04 | −2.177E−02 | 3.178E−02 |
| A4 | 3.561E−02 | −9.577E−02 | −2.011E−02 | −8.207E−02 |
| A5 | −3.956E−02 | 1.665E−02 | −1.002E−01 | 2.156E−01 |
| A6 | −2.871E−02 | −4.068E−02 | 9.412E−02 | −1.472E−01 |
| A7 | 1.141E−01 | 2.096E−02 | −8.467E−02 | −5.947E−02 |
| A8 | −9.605E−02 | −5.474E−02 | −2.669E−02 | 5.558E−02 |
| A9 | 8.473E−03 | 1.138E−01 | 1.855E−01 | 8.834E−02 |
| A10 | 6.691E−03 | −4.779E−02 | −8.665E−02 | −5.218E−02 |

| | FIFTH SURFACE | SIXTH SURFACE | SEVENTH SURFACE | EIGHTH SURFACE |
|---|---|---|---|---|
| K | 9.981E+00 | −4.818E+01 | −9.000E+01 | −8.124E+00 |
| A3 | −5.115E−03 | −2.080E−01 | −1.891E−01 | −1.004E−01 |
| A4 | −4.239E−02 | 1.771E−02 | −2.846E−02 | 3.012E−02 |
| A5 | 3.183E−02 | 8.272E−02 | −8.073E−03 | −2.578E−02 |
| A6 | 5.488E−02 | −2.521E−02 | 1.878E−02 | 2.373E−02 |
| A7 | −8.082E−02 | −1.400E−02 | 1.145E−02 | −1.471E−02 |
| A8 | −8.089E−03 | 5.260E−03 | −2.529E−03 | 2.159E−03 |
| A9 | 5.340E−02 | 7.590E−03 | −1.260E−03 | 1.422E−03 |
| A10 | −2.267E−02 | −3.225E−03 | 6.732E−05 | −4.370E−04 |

TABLE 4A

EXAMPLE 4, BASIC LENS DATA

| Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|
| 0 (APERTURE DIAPHRAGM) | — | 0.000 | | |
| 1 | 2.144 | 0.811 | 1.531 | 55.4 |
| 2 | 77.158 | 0.105 | | |
| 3 | 4.650 | 0.479 | 1.614 | 25.5 |
| 4 | 2.922 | 0.861 | | |
| 5 | −25.222 | 0.722 | 1.531 | 55.4 |
| 6 | −2.171 | 0.571 | | |
| 7 | −3122.258 | 0.490 | 1.510 | 56.5 |
| 8 | 1.410 | 0.500 | | |
| 9 | ∞ | 0.145 | 1.516 | 64.1 |
| 10 | ∞ | 0.319 | | |

(f = 4.383, Fno. = 2.82)

TABLE 4B

EXAMPLE 4, ASPHERIC DATA

| ASPHERIC SURFACE COEFFICIENT | FIRST SURFACE | SECOND SURFACE | THIRD SURFACE | FOURTH SURFACE |
|---|---|---|---|---|
| K | −2.085E−01 | −9.500E+01 | −4.816E+01 | −8.322E+00 |
| A3 | −7.320E−03 | −1.412E−03 | −2.459E−02 | 3.218E−02 |
| A4 | 3.273E−02 | −2.574E−01 | −9.792E−02 | −1.180E−01 |
| A5 | −8.044E−02 | 4.703E−02 | −1.579E−01 | 1.929E−01 |
| A6 | −3.788E−03 | 1.040E−02 | 1.261E−01 | −1.390E−01 |
| A7 | 1.413E−01 | 4.515E−02 | −2.863E−03 | −3.343E−02 |
| A8 | −1.236E−01 | −3.060E−02 | 3.914E−02 | 7.111E−02 |
| A9 | −5.045E−02 | 1.296E−01 | 1.853E−01 | 8.222E−02 |
| A10 | 4.604E−02 | −1.135E−01 | −1.649E−01 | −6.631E−02 |

| | FIFTH SURFACE | SIXTH SURFACE | SEVENTH SURFACE | EIGHTH SURFACE |
|---|---|---|---|---|
| K | −9.795E+00 | −4.007E+01 | −8.900E+01 | −6.559E+00 |
| A3 | 1.986E−02 | −2.043E−01 | −1.945E−01 | −1.081E−01 |
| A4 | −5.869E−02 | 2.252E−02 | −2.728E−02 | 2.652E−02 |
| A5 | 3.923E−02 | 8.871E−02 | −7.323E−03 | −2.004E−02 |
| A6 | 6.000E−02 | −2.430E−02 | 1.943E−02 | 2.346E−02 |
| A7 | −8.202E−02 | −1.491E−02 | 1.186E−02 | −1.482E−02 |
| A8 | −1.164E−02 | 4.488E−03 | −2.367E−03 | 2.114E−03 |
| A9 | 5.169E−02 | 7.385E−03 | −1.270E−03 | 1.413E−03 |
| A10 | −2.034E−02 | −3.028E−03 | −1.240E−05 | −4.326E−04 |

TABLE 5A

EXAMPLE 5, BASIC LENS DATA

| Si (SURFACE NUMBER) | Ri (CURVATURE RADIUS) | Di (SURFACE SPACING) | Ndj (REFRACTIVE INDEX) | vdj (ABBE NUMBER) |
|---|---|---|---|---|
| 0 (APERTURE DIAPHRAGM) | — | −0.100 | | |
| 1 | 1.711 | 0.806 | 1.531 | 55.4 |
| 2 | 37.803 | 0.100 | | |
| 3 | 9.178 | 0.479 | 1.614 | 25.5 |
| 4 | 2.792 | 0.823 | | |
| 5 | −12.290 | 0.959 | 1.531 | 55.4 |
| 6 | −2.612 | 0.583 | | |
| 7 | −4669.247 | 0.492 | 1.510 | 56.5 |
| 8 | 1.941 | 0.700 | | |
| 9 | ∞ | 0.145 | 1.516 | 64.1 |
| 10 | ∞ | 0.106 | | |

(f = 4.717, Fno. = 2.79)

TABLE 5B

EXAMPLE 5, ASPHERIC DATA

| ASPHERIC SURFACE COEFFICIENT | FIRST SURFACE | SECOND SURFACE | THIRD SURFACE | FOURTH SURFACE |
|---|---|---|---|---|
| K | 1.479E−01 | −9.900E+01 | −5.000E+01 | −3.150E+00 |
| A3 | −2.602E−03 | 3.549E−03 | −9.587E−03 | 2.878E−02 |
| A4 | 3.443E−02 | −2.162E−02 | 2.710E−02 | −6.447E−02 |
| A5 | −1.843E−02 | 1.659E−02 | −8.252E−02 | 2.219E−01 |
| A6 | −2.901E−02 | −6.643E−02 | 6.999E−02 | −1.553E−01 |
| A7 | 1.047E−01 | 4.126E−03 | −1.225E−01 | −6.888E−02 |
| A8 | −9.235E−02 | −5.952E−02 | −4.961E−02 | 5.433E−02 |
| A9 | 2.047E−02 | 1.121E−01 | 1.822E−01 | 9.366E−02 |
| A10 | 3.561E−04 | −5.567E−02 | −8.246E−02 | −5.058E−02 |

| | FIFTH SURFACE | SIXTH SURFACE | SEVENTH SURFACE | EIGHTH SURFACE |
|---|---|---|---|---|
| K | −9.353E+00 | −5.000E+01 | −9.500E+01 | −8.104E+00 |
| A3 | −2.037E−03 | −1.955E−01 | −1.766E−01 | −1.027E−01 |
| A4 | −4.550E−02 | 1.197E−02 | −3.063E−02 | 2.585E−02 |
| A5 | 2.696E−02 | 7.420E−02 | −9.553E−03 | −2.651E−02 |
| A6 | 4.945E−02 | −2.713E−02 | 1.795E−02 | 2.519E−02 |
| A7 | −7.914E−02 | −1.340E−02 | 1.107E−02 | −1.502E−02 |
| A8 | −4.027E−03 | 5.953E−03 | −2.642E−03 | 2.023E−03 |
| A9 | 5.498E−02 | 7.788E−03 | −1.235E−03 | 1.414E−03 |
| A10 | −2.564E−02 | −3.395E−03 | 1.368E−04 | −4.155E−04 |

TABLE 6A

EXAMPLE 6, BASIC LENS DATA

| Si (SURFACE NUMBER) | Ri (CURVATURE RADIUS) | Di (SURFACE SPACING) | Ndj (REFRACTIVE INDEX) | νdj (ABBE NUMBER) |
|---|---|---|---|---|
| 0(APERTURE DIAPHRAGM) | — | −0.130 | | |
| 1 | 1.669 | 0.807 | 1.531 | 55.4 |
| 2 | 56.301 | 0.100 | | |
| 3 | 8.065 | 0.479 | 1.614 | 25.5 |
| 4 | 2.492 | 0.905 | | |
| 5 | −9.433 | 1.040 | 1.531 | 55.4 |
| 6 | −2.932 | 0.539 | | |
| 7 | −997.097 | 0.494 | 1.510 | 56.5 |
| 8 | 2.311 | 0.500 | | |
| 9 | ∞ | 0.145 | 1.516 | 64.1 |
| 10 | ∞ | 0.294 | | |

(f = 4.916, Fno. = 2.80)

TABLE 6B

EXAMPLE 6, ASPHERIC DATA

| ASPHERIC SURFACE COEFFICIENT | SURFACE NUMBER | | | |
|---|---|---|---|---|
| | FIRST SURFACE | SECOND SURFACE | THIRD SURFACE | FOURTH SURFACE |
| K | 1.662E−01 | −9.900E+01 | 1.819E−01 | −2.344E+00 |
| A3 | −2.560E−03 | −5.256E−03 | −1.545E−02 | 3.078E−02 |
| A4 | 3.392E−02 | 2.730E−03 | 4.452E−02 | −6.383E−02 |
| A5 | −1.261E−02 | 1.908E−02 | −9.677E−02 | 2.370E−01 |
| A6 | −3.749E−02 | −9.543E−02 | 7.497E−02 | −1.635E−01 |
| A7 | 1.014E−01 | 3.356E−03 | −1.227E−01 | −7.023E−02 |
| A8 | −8.358E−02 | −4.071E−02 | −5.643E−02 | 6.049E−02 |
| A9 | 2.629E−02 | 1.236E−01 | 1.863E−01 | 9.077E−02 |
| A10 | −9.038E−03 | −7.371E−02 | −8.451E−02 | −4.788E−02 |
| | FIFTH SURFACE | SIXTH SURFACE | SEVENTH SURFACE | EIGHTH SURFACE |
| K | −1.000E+01 | −5.000E+01 | −9.000E+01 | −9.466E+00 |
| A3 | −9.460E−03 | −1.815E−01 | −1.816E−01 | −9.864E−02 |
| A4 | −3.590E−02 | 4.102E−03 | −2.773E−02 | 1.691E−02 |
| A5 | 1.200E−02 | 6.795E−02 | −9.702E−03 | −2.716E−02 |
| A6 | 3.585E−02 | −2.960E−02 | 1.713E−02 | 2.624E−02 |
| A7 | −7.711E−02 | −1.414E−02 | 1.054E−02 | −1.475E−02 |
| A8 | 4.557E−02 | 5.930E−03 | −2.848E−03 | 2.047E−03 |
| A9 | 5.896E−02 | 7.984E−03 | −1.234E−03 | 1.387E−03 |
| A10 | −3.154E−02 | −3.199E−03 | 2.238E−04 | −4.409E−04 |

In Examples 2 to 6, similar to the imaging lens according to Example 1, the first to fourth lenses G1 to G4 each have aspheric surfaces at both sides.

In the imaging lenses according to Examples 1 to 6, all of the first to fourth lenses G1 to G4 are made of a resin material.

Table 7 shows values related to the above-mentioned conditional expressions according to Examples 1 to 6.

As can be seen from Table 7, the values of Examples 1 to 6 are within the numerical ranges of the above-mentioned conditional expressions.

Figure 7B:
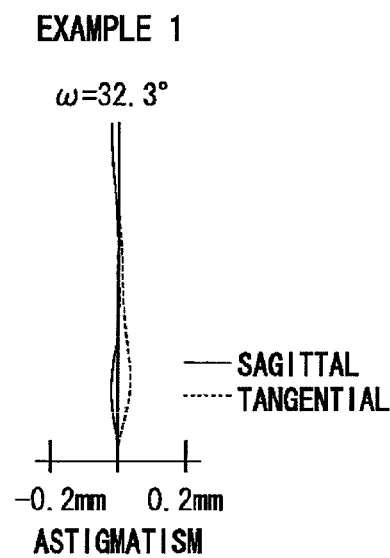
Figure 7C:
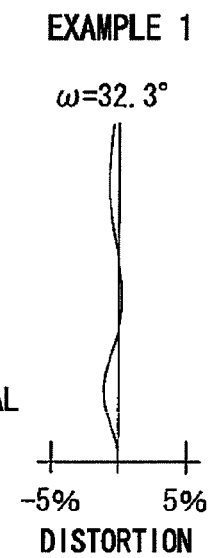

FIGS. 7A to 7C respectively show the spherical aberrations, astigmatisms, and distortions of the imaging lens according to Example 1. Each of the aberration diagrams shows aberrations using the d-line (wavelength: 587.6 nm) as a reference wavelength. Each of the spherical aberration diagrams shows aberrations with respect to the g-line (wavelength: 435.8 nm) and the C-line (wavelength: 656.3 nm). In the astigmatism diagrams, a solid line indicates aberrations in a sagittal direction, and a dotted line indicates aberrations in a tangential direction. In addition, Fno. indicates an F number, and ω indicates a half angle of view.

Figure 8A:
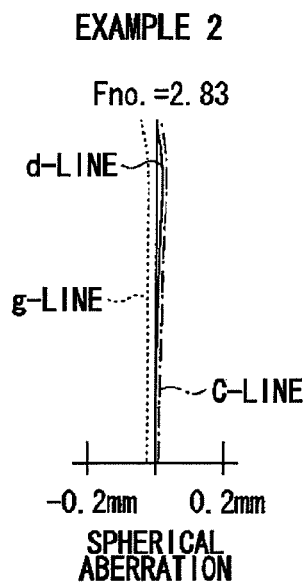
FIGS. 8A to 8C are diagrams illustrating all aberrations of the imaging lens according to Example 2 of the invention.
Figure 8B:
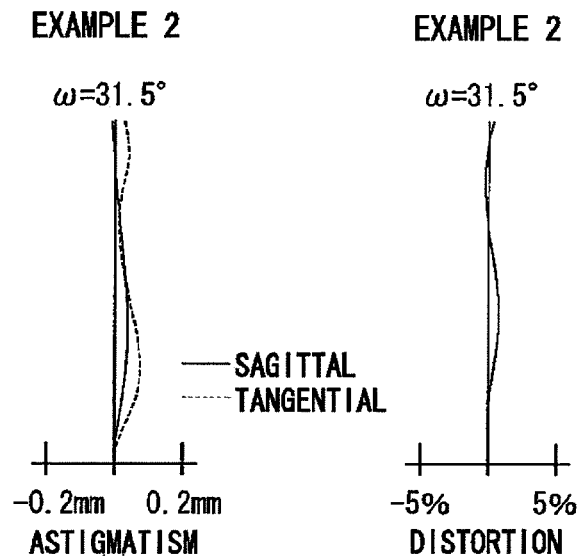
Figure 8C:
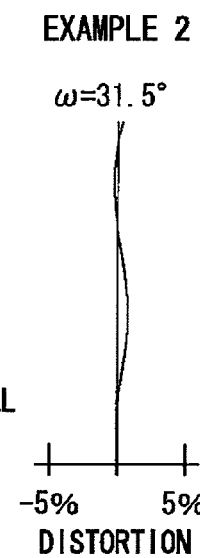
Figure 9A:
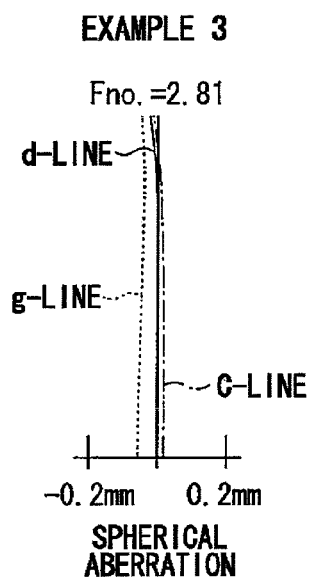
FIGS. 9A to 9C are diagrams illustrating all aberrations of the imaging lens according to Example 3 of the invention.
Figure 9B:
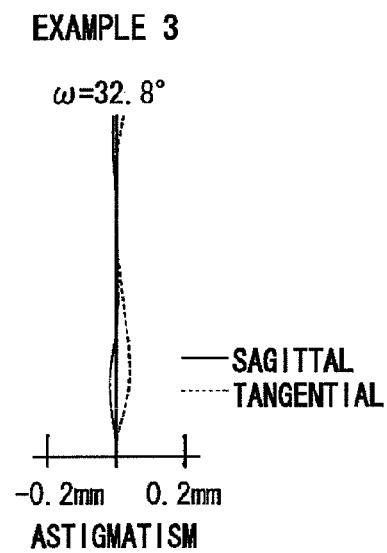
Figure 9C:
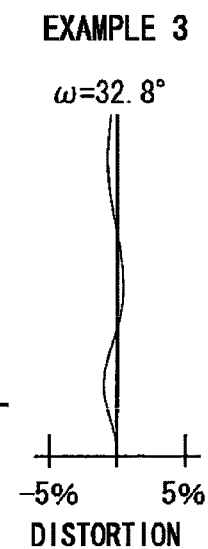
Figure 10A:
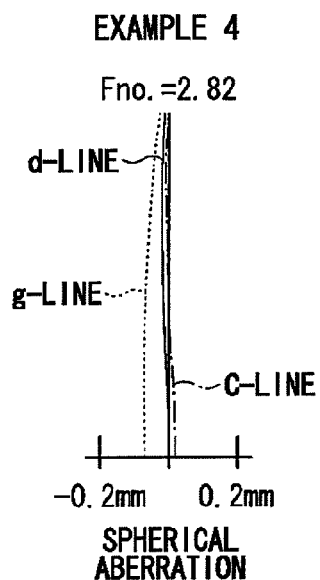
FIGS. 10A to 10C are diagrams illustrating all aberrations of the imaging lens according to Example 4 of the invention.
Figure 10B:
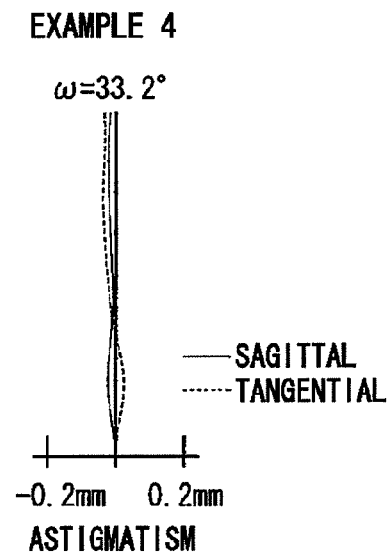
Figure 10C:
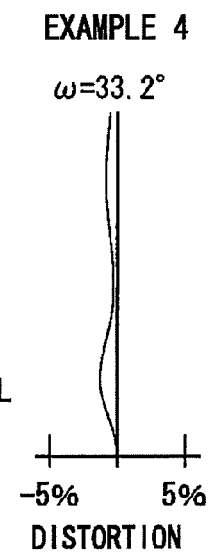
Figure 11A:
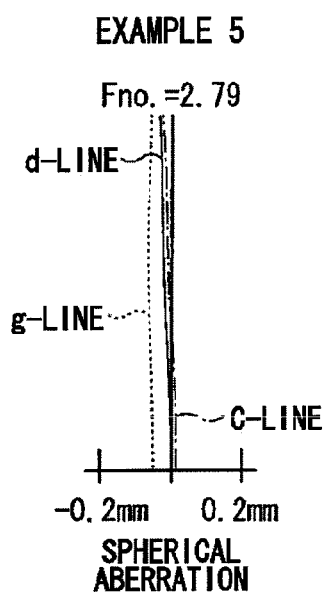
FIGS. 11A to 11C are diagrams illustrating all aberrations of the imaging lens according to Example 5 of the invention.
Figure 11B:
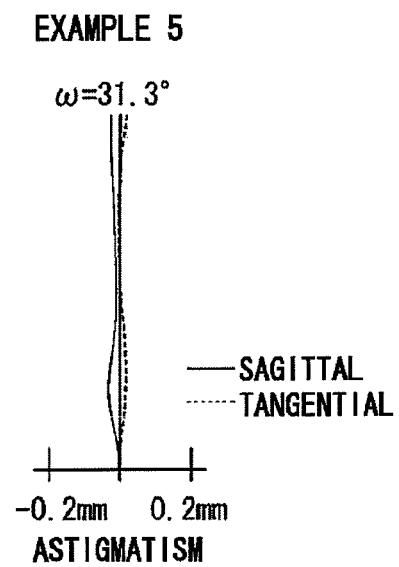
Figure 11C:
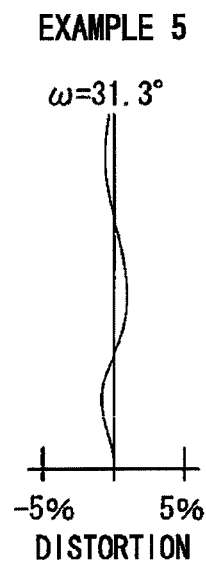
Figure 12A:
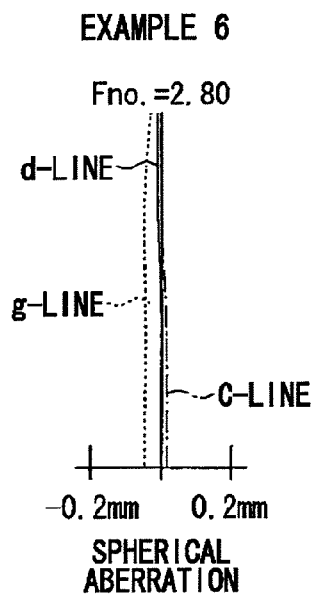
FIGS. 12A to 12C are diagrams illustrating all aberrations of the imaging lens according to Example 6 of the invention.
Figure 12B:
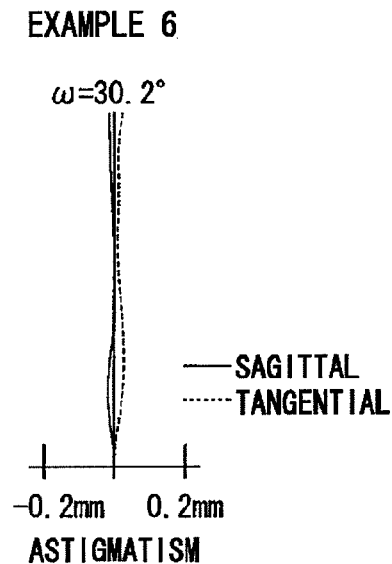
Figure 12C:
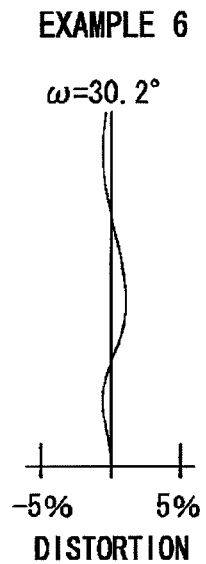

Similarly, FIGS. 8A to 8C show all aberrations of the imaging lens according to Example 2. Similarly, FIGS. 9A to 9C show all aberrations of the imaging lens according to Example 3, FIGS. 10A to 10C show all aberrations of the imaging lens according to Example 4, FIGS. 11A to 11C show all aberrations of the imaging lens according to Example 5, and FIGS. 12A to 12C show all aberrations of the imaging lens according to Example 6.

As can be seen from the numerical data and the aberration diagrams, in all of Examples 1 to 6, it is possible to reduce the total length of the imaging lens, thereby reducing the size of the imaging lens. In addition, it is possible to obtain high imaging performance.

Although the embodiments and examples of the invention have been described above, the invention is not limited thereto. Various modifications and changes of the invention can be made without departing from the scope and spirit of the invention. For example, the curvature radius, the surface spacing, and the refractive index of each lens component are

TABLE 7

VALUES RELATED TO CONDITIONAL EXPRESSION

| | CONDITIONAL EXPRESSION (1) | CONDITIONAL EXPRESSION (2) | CONDITIONAL EXPRESSION (3) | CONDITIONAL EXPRESSION (4) | CONDITIONAL EXPRESSION (5) | CONDITIONAL EXPRESSION (6) |
|---|---|---|---|---|---|---|
| EXAMPLE 1 | 0.965 | 0.711 | 1.540 | 1.124 | 29.9 | 0.220 |
| EXAMPLE 2 | 0.705 | 0.699 | 1.043 | 0.944 | 31.0 | 0.182 |
| EXAMPLE 3 | 0.914 | 0.713 | 2.084 | 1.121 | 29.9 | 0.189 |
| EXAMPLE 4 | 0.946 | 0.631 | 3.268 | 1.009 | 29.9 | 0.196 |
| EXAMPLE 5 | 0.913 | 0.807 | 1.426 | 1.280 | 29.9 | 0.175 |
| EXAMPLE 6 | 0.942 | 0.920 | 1.235 | 1.544 | 29.9 | 0.184 |

What is claimed is:

1. An imaging lens comprising:
   an aperture diaphragm;
   a first lens having a positive power;
   a second lens having a negative power;
   a third lens that has a positive power and includes a convex image-side surface; and
   a fourth lens that has a negative power and includes an object-side surface which is concave or flat near an optical axis,
   wherein the first to fourth lenses are arranged in this order from an object side, and
   the imaging lens satisfies the following conditional expression:

$$0.5 < (|R2| - R1)/(R1 + |R2|)$$

where R1 indicates a curvature radius of an object-side surface of the first lens and R2 indicates a curvature radius of an image-side surface of the first lens,
   wherein the first lens has a meniscus shape near an optical axis in which a convex surface faces the object side
   wherein the imaging lens satisfies the following conditional expression:

$$0.6 < |f4/f| < 1.0$$

where f indicates a focal length of the entire lens system and f4 indicates a focal length of the fourth lens.

2. The imaging lens according to claim 1,
   wherein the imaging lens satisfies the following conditional expression:

$$0.5 < |f2/f| < 4$$

where f indicates a focal length of the entire lens system and f2 indicates a focal length of the second lens.

3. The imaging lens according to claim 1,
   wherein the imaging lens satisfies the following conditional expression:

$$0.5 < f3/f < 2$$

where f indicates a focal length of the entire lens system and f3 indicates a focal length of the third lens.

4. The imaging lens according to claim 1,
   wherein the imaging lens satisfies the following conditional expression:

$$20 < v1 - v2$$

where v1 indicates an Abbe number of the first lens with respect to the d-line and v2 indicates an Abbe number of the second lens with respect to the d-line.

5. The imaging lens according to claim 1,
   wherein the second lens has a meniscus shape in which a convex surface faces the object side, and satisfies the following conditional expression:

$$0.1 < D4/f < 0.3$$

where f indicates a focal length of the entire lens system and D4 indicates a gap between the second lens and the third lens on the optical axis.

6. The imaging lens according to claim 1,
   wherein the imaging lens satisfies the following conditional expression:

$$|R5| > |R6|$$

where R5 indicates a curvature radius of an object-side surface of the third lens and R6 indicates a curvature radius of the image-side surface of the third lens.

7. The imaging lens according to claim 1,
   wherein each of the first lens, the second lens, the third lens, and the fourth lens has at least one aspheric surface.

8. The imaging lens according to claim 1,
   wherein each of the first lens, the second lens, the third lens, and the fourth lens is made of a resin material.

9. The imaging lens according to claim 1,
   wherein the first lens is made of a glass material.

10. A camera module comprising:
    the imaging lens according to claim 1; and
    an imaging device that outputs an image signal corresponding to an optical image formed by the imaging lens.

11. An imaging apparatus comprising the camera module according to claim 10.

12. An imaging lens comprising:
    an aperture diaphragm;
    a first lens having a positive power;
    a second lens having a negative power;
    a third lens that has a positive power and includes a convex image-side surface; and
    a fourth lens that has a negative power and includes an object-side surface which is concave or flat near an optical axis,
    wherein the first to fourth lenses are arranged in this order from an object side, and
    the imaging lens satisfies the following conditional expression:

$$0.5 < (|R2| - R1)/(R1 + |R2|)$$

where R1 indicates a curvature radius of an object-side surface of the first lens and R2 indicates a curvature radius of an image-side surface of the first lens; and
    said aperture diaphragm is provided between the top of the object-side surface of the first lens and the top of an image-side surface of the first lens on the optical axis.

13. The imaging lens according to claim 12,
    wherein the aperture diaphragm is provided between a top of the object-side surface of the first lens and an edge of the object-side surface of the first lens in an effective diameter range on an optical axis.

14. An imaging lens comprising:
    an aperture diaphragm;
    a first lens having a positive power;
    a second lens having a negative power;
    a third lens that has a positive power and includes a convex image-side surface; and
    a fourth lens that has a negative power and includes an object-side surface which is concave or flat near an optical axis,
    wherein the first to fourth lenses are arranged in this order from an object side, and
    the imaging lens satisfies the following conditional expression:

$$0.5 < (|R2| - R1)/(R1 + |R2|)$$

where R1 indicates a curvature radius of an object-side surface of the first lens and R2 indicates a curvature radius of an image-side surface of the first lens and
    wherein the imaging lens satisfies the following conditional expression:

$$1.426 \leq |f2/f| < 4$$

wherein f indicates a focal length of the entire lens system and f2 indicates a focal length of the second lens.

15. The imaging lens according to claim 14,
wherein the imaging lens satisfies the following conditional expression:

$$0.5<f3/f<2$$

where f indicates a focal length of the entire lens system and f3 indicates a focal length of the third lens.

16. The imaging lens according to claim 14,
wherein the imaging lens satisfies the following conditional expression:

$$20<v1-v2$$

where v1 indicates an Abbe number of the first lens with respect to the d-line and v2 indicates an Abbe number of the second lens with respect to the d-line.

17. The imaging lens according to claim 14,
wherein the first lens has a meniscus shape near an optical axis in which a convex surface faces the object side.

18. The imaging lens according to claim 14,
wherein the second lens has a meniscus shape in which a convex surface faces the object side, and satisfies the following conditional expression:

$$0.1<D4/f<0.3$$

where f indicates a focal length of the entire lens system and D4 indicates a gap between the second lens and the third lens on the optical axis.

19. The imaging lens according to claim 14,
wherein the aperture diaphragm is disposed in front of the first lens.

20. An imaging lens comprising:
an aperture diaphragm;
a first lens having a positive power;
a second lens having a negative power;
a third lens that has a positive power and includes a convex image-side surface; and
a fourth lens that has a negative power and includes an object-side surface which is concave or flat near an optical axis,
wherein the first to fourth lenses are arranged in this order from an object side, and
the imaging lens satisfies the following conditional expression:

$$0.5<(|R2|-R1)/(R1+|R2|)$$

where R1 indicates a curvature radius of an object-side surface of the first lens and R2 indicates a curvature radius of an image-side surface of the first lens
wherein the imaging lens satisfies the following conditional expression:

$$0.9<f3/f<1.7$$

wherein f indicates a focal length of the entire lens system and f3 indicates a focal length of the third lens.

21. The imaging lens according to claim 20,
wherein the imaging lens satisfies the following conditional expression:

$$0.5<|f2/f|<4$$

where f indicates a focal length of the entire lens system and f2 indicates a focal length of the second lens.

22. The imaging lens according to claim 20,
wherein the imaging lens satisfies the following conditional expression:

$$20<v1-v2$$

where v1 indicates an Abbe number of the first lens with respect to the d-line and v2 indicates an Abbe number of the second lens with respect to the d-line.

23. The imaging lens according to claim 20,
wherein the first lens has a meniscus shape near an optical axis in which a convex surface faces the object side.

24. The imaging lens according to claim 20,
wherein the second lens has a meniscus shape in which a convex surface faces the object side, and satisfies the following conditional expression:

$$0.1<D4/f<0.3$$

where f indicates a focal length of the entire lens system and D4 indicates a gap between the second lens and the third lens on the optical axis.

25. The imaging lens according to claim 20,
wherein the aperture diaphragm is disposed in front of the first lens.

26. An imaging lens comprising:
an aperture diaphragm;
a first lens having a positive power;
a second lens having a negative power;
a third lens that has a positive power and includes a convex image-side surface; and
a fourth lens that has a negative power and includes an object-side surface which is concave or flat near an optical axis,
wherein the first to fourth lenses are arranged in this order from an object side, and
the imaging lens satisfies the following conditional expression:

$$0.5<(|R2|-R1)/(R1+|R2|)$$

where R1 indicates a curvature radius of an object-side surface of the first lens and R2 indicates a curvature radius of an image-side surface of the first lens and
wherein the imaging lens satisfies the following conditional expression:

$$20<v1-v\leq31.0$$

where v1 indicates an Abbe number of the first lens with respect to the d-line and v2 indicates an Abbe number of the second lens with respect to the d-line.

27. The imaging lens according to claim 26,
wherein the imaging lens satisfies the following conditional expression:

$$0.5<|f2/f|<4$$

where f indicates a focal length of the entire lens system and f2 indicates a focal length of the second lens.

28. The imaging lens according to claim 26,
wherein the imaging lens satisfies the following conditional expression:

$$0.5<f3/f<2$$

where f indicates a focal length of the entire lens system and f3 indicates a focal length of the third lens.

29. The imaging lens according to claim 26,
wherein the first lens has a meniscus shape near an optical axis in which a convex surface faces the object side.

30. The imaging lens according to claim 26,
wherein the second lens has a meniscus shape in which a convex surface faces the object side, and satisfies the following conditional expression:

$$0.1<D4/f<0.3$$

where f indicates a focal length of the entire lens system and D4 indicates a gap between the second lens and the third lens on the optical axis.

31. The imaging lens according to claim 26,
wherein the aperture diaphragm is disposed in front of the first lens.

* * * * *